US005283594A

United States Patent [19]

Iwao

[11] Patent Number: 5,283,594

[45] Date of Patent: Feb. 1, 1994

[54] COLOR IMAGE RECORDING APPARATUS FOR RECORDING A COLOR IMAGE ON A RECORDING MEDIUM WITH COLOR PARTICLES WITH A VIBRATING PRINT HEAD

[75] Inventor: Naoto Iwao, Nagoya, Japan

[73] Assignee: Brother Kogyo Kabushiki Kaisha, Nagoya, Japan

[21] Appl. No.: 808,587

[22] Filed: Dec. 17, 1991

[30] Foreign Application Priority Data

Dec. 18, 1990 [JP] Japan ........................ 2-403150

[51] Int. Cl.$^5$ ........................ G01D 15/06

[52] U.S. Cl. ........................ 346/159; 346/157

[58] Field of Search ........................ 346/157, 159; 355/327

[56] References Cited

U.S. PATENT DOCUMENTS

| | | | |
|---|---|---|---|
| 3,689,935 | 9/1972 | Pressman et al. | 346/159 |
| 3,855,600 | 12/1974 | Potma | 346/74 ES |
| 3,985,435 | 10/1976 | Suzuki et al. | 355/327 |
| 4,491,855 | 1/1985 | Fujii et al. | 346/159 |
| 4,568,955 | 2/1986 | Hosoya et al. | 346/153.1 |
| 4,743,926 | 5/1988 | Schmidlin et al. | 346/159 |
| 4,885,466 | 12/1989 | Koichi et al. | 250/324 |
| 5,031,004 | 7/1991 | Borostyan | 355/327 |
| 5,095,322 | 3/1992 | Fletcher | 346/159 |
| 5,099,271 | 3/1992 | Maeda et al. | 355/27 |
| 5,128,695 | 7/1992 | Maeda | 346/140 R |
| 5,153,611 | 10/1992 | Kokado et al. | 346/140 R |
| 5,170,185 | 12/1992 | Takemura et al. | 346/159 X |

*Primary Examiner*—Benjamin R. Fuller
*Assistant Examiner*—Randy W. Gibson
*Attorney, Agent, or Firm*—Oliff & Berridge

[57] ABSTRACT

The control electrode unit including an insulative layer, a reference electrode on one surface of the insulative layer and at least one segment control electrode on an opposite surface of the insulative layer to which an image signal is applied. The control electrode unit has at least one row of apertures which pass through the segment control electrode, the insulative layer and the reference electrode, so that the charged particles pass through the apertures. The image recording apparatus includes a plurality of carrying units for carrying charged particles of different colors, and a moving unit for moving one of the carrying unit to the position disposed confronting the recording medium through the position confronting the medium through the control electrode unit. One of the carrying units is disposed at a position confronting the medium through the control electrode unit so that the charged particles carried by the carrying unit are carried toward the recording medium through the apertures. Thus, the image recording apparatus has a single control electrode unit, even though the image recording apparatus has the plurality of carrying units. Two levels of vibration are applied to the control electrode unit. A first level, in the recording mode, prevents particles from adhering to the electrode. A second level, in a non-recording mode is at a higher level to remove particles from the electrode. In an alternative embodiment, the plurality of carrying units are fixed in position and each has a corresponding control electrode. Image formation occurs by controlling movement of the recording medium relative to the carrying units.

12 Claims, 8 Drawing Sheets

Fig.5(B)

| | |
|---|---|
| S1 | Whether the changeover member 303 directs A.C. power source 302 or not |
| S2 | Changeover member 303 directs A.C. power sources 302 |
| S3 | Whether no recording mode exists or not |
| S4 | Whether changeover member 303 directs A.C. power source 301 or not |
| S5 | Changeover member 303 directs the A.C. power source 301 |
| S6 | Which carrying units 200y, 200m, 200c and 200b are disposed at the recording position |
| S7 | Predetermined carrying unit is disposed at the recording position |
| S8 | Recording operation relating to predetermined color image |
| S9 | Whether recording operation relating to all color images has completed or not |
| S10 | Recording medium P is fed by one dot line |
| S11 | Whether the recording operation relating to all color images on the Recording medium P has completed or not |
| S12 | Recording medium P is fed by determined amount toward the outlet 118 |

COLOR IMAGE RECORDING APPARATUS FOR RECORDING A COLOR IMAGE ON A RECORDING MEDIUM WITH COLOR PARTICLES WITH A VIBRATING PRINT HEAD

BACKGROUND OF THE INVENTION

1. Field of the Invention

The present invention relates to a color image recording apparatus which is employed in a copy machine, a plotter, a printer and a facsimile machine and, more particularly to a color image recording apparatus which directly controls a flow of toner particles and records a color image on a recording medium with color toner particles.

2. Description of Related Art

There has been proposed, for example, an image recording apparatus disclosed in U.S. Pat. No. 3,689,935. The image recording apparatus has an image recording unit which charges toner particles and forms a mist of the charged toner particles. The image recording unit generates an electric field between a control electrode having apertures through which the charged toner particles can pass and a back electrode, and records an image on a support member inserted between both the electrodes, by directly controlling the charged toner particles.

However, when the image is recorded using the above mentioned image recording apparatus, an image of only a single, predetermined color (monochromatic) is formed on a recording medium, because the image recording apparatus has only a single image recording unit which includes toner particles having the predetermined monochromatic color. Further, another problem occurs in that the apertures of the control electrode become clogged with the toner particles.

SUMMARY OF THE INVENTION

It is an object of the invention to provide a color image recording apparatus capable of obtaining a high quality color image on a recording medium with color toner particles.

It is a further object of the present invention to provide a color image recording apparatus, having a simple structure, capable of forming a color image on a recording medium.

It is a further object of the present invention to provide a color image recording apparatus capable of preventing apertures of a control electrode from being clogged.

In order to attain the above objects, a color image recording apparatus for recording a color image on a recording medium with charged particles having predetermined colors is provided comprising: a feeding unit for feeding the recording medium; a control electrode unit having at least one row of apertures through which the charged particles pass based on an image signal, the control electrode unit including an insulative layer, a reference electrode on one surface of the insulative layer and at least one segment control electrode on an opposite surface of the insulative layer which the image signal is applied to, the aperture passing through the segment control electrode, the insulative layer and the reference electrode; a plurality of carrying units for providing charged particles of different colors, respectively, one of the carrying units disposed at a position confronting the medium through the control electrode unit so that the charged particles provided by the carrying unit are carried to the recording medium through the apertures; a moving unit for moving one of the carrying units to the position disposed confronting the recording medium through the control electrode unit.

Further, the image recording apparatus may have a vibration applying unit for vibrating the control electrode and a controlling unit for controlling the vibration applying unit so that the magnitude of vibration of said vibrating means is changed between the recording mode, when the charged particles provided by the carrying unit are carried to the recording medium through the apertures, and a no recording mode, when the charged particles provided by the carrying unit are not carried to the recording medium through the apertures.

According to the image recording apparatus of the invention, the control electrode unit includes an insulative layer, a reference electrode on one surface of the insulative layer and at least one segment control electrode on an opposite surface of the insulative layer, to which the image signal is applied. The control electrode unit has at least one row of apertures which pass through the segment control electrode, the insulative layer and the reference electrode, so that the charged particles pass through the control electrode unit. The image recording apparatus comprises a plurality of carrying units for providing charged particles with different colors and a moving unit for moving one of the carrying units to the position disposed confronting the recording medium through the control electrode unit. One of the carrying units is disposed at a position confronting the recording medium through the control electrode unit so that the charged particles provided by the carrying unit are carried toward the recording medium through the apertures. Therefore, the image recording apparatus may have a single control electrode unit, even though the image recording apparatus has the plurality of carrying units.

BRIEF DESCRIPTION OF THE DRAWINGS

The above and other objects, features and advantages of the invention will become more apparent from reading the following description of the preferred embodiments taken in connection with the accompanying drawings in which:

FIGS. 5(A) and 5(B) are a flow chart and table, respectively, showing the operation of the image recording apparatus;

DETAILED DESCRIPTION OF THE PREFERRED EMBODIMENTS

Referring now to the accompanying drawings, preferred embodiments of the invention will be described in detail.

Figure 1:
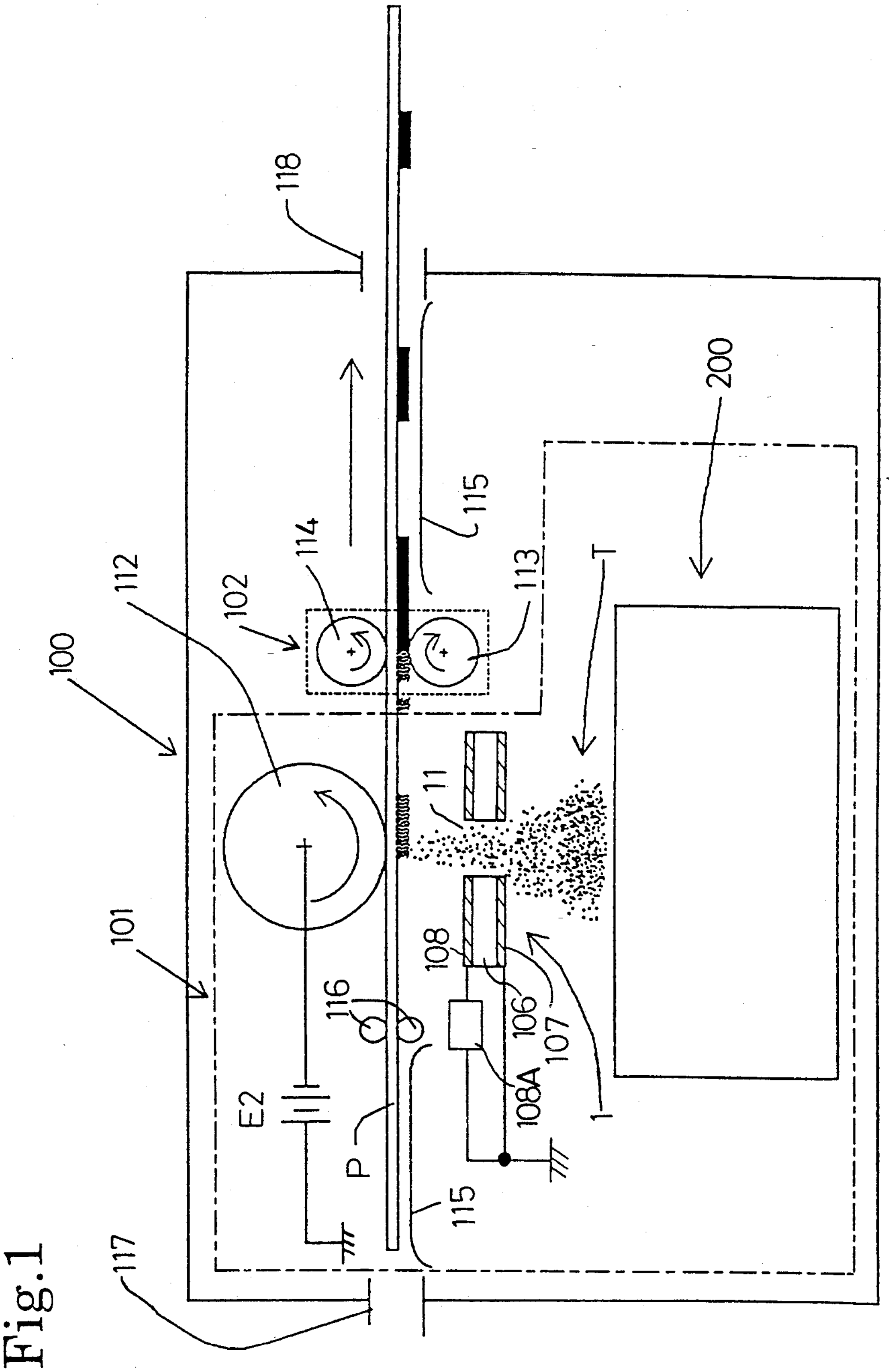
FIG. 1 schematically shows a structure of a first embodiment of an image recording apparatus which embodies this invention.

As shown in FIG. 1, an image recording apparatus 100 is roughly divided into an image recording portion 101 and a thermal fixing portion 102. On the sides of this image recording apparatus 100, a sheet inlet 117 for inserting a recording medium P on which an image will be recorded and a sheet outlet 118 for discharging the recording medium P having the image recorded thereon are installed. A sheet passage for feeding the recording medium P is formed between the sheet inlet 117 and the sheet outlet 118 in the image recording apparatus 100 and a pair of feed rollers 116, which function as feeding means, are installed along the sheet passage.

The main part of the image recording portion 101 is divided into particle control member 1, which functions as a control electrode means, an electrode roller 112, which functions as a back electrode means, and a toner supplying unit 200 for supplying toner particles T toward the particle control member 1.

Figure 2:
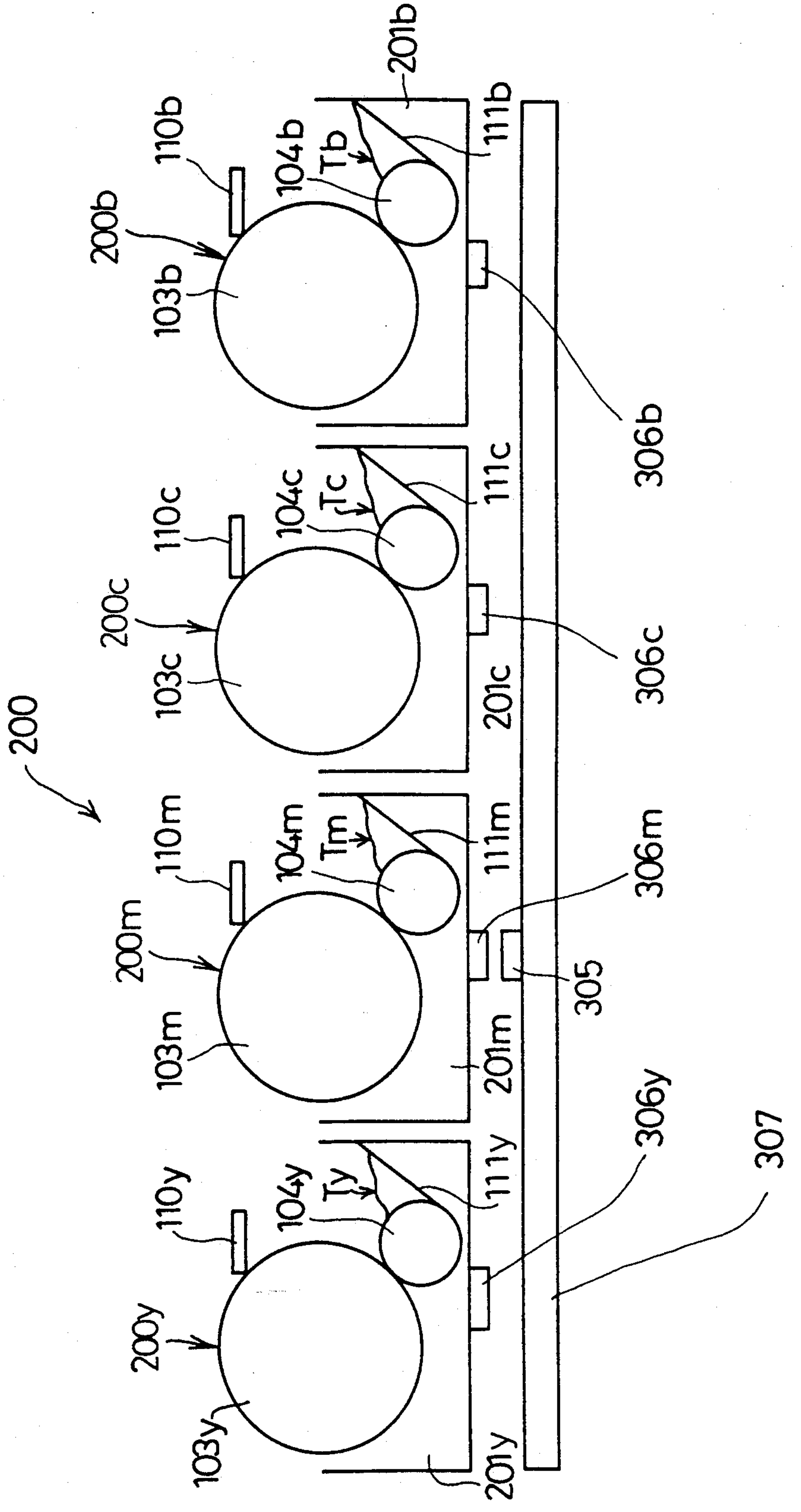
FIG. 2 schematically shows a structure of plurality of carrying units in an image recording apparatus of the first embodiment.

The toner supplying unit 200 has, as shown in FIG. 2, four carrying units 200*y*, 200*m*, 200*c* and 200*b* which are arranged along the sheet passage in order of the feed direction of the recording medium P. The carrying units 200, which function as carrying means, carry charged toner particles T of different colors, respectively. As shown, the colors are yellow, magenta, cyan, black, with each of the charged color toner particles being referred to, respectively, as Ty (yellow), Tm (magenta), Tc (cyan) and Tb (black).

The carrying units 200 have four toner tanks 201*y*, 201*m*, 201*c* and 201*b* for accommodating the yellow toner particles Ty, the magenta toner particles Tm, the cyan toner particles Tc and the black toner particles Tb, respectively, and have four rotatable brush rollers 103*y*, 103*m*, 103*c* and 103*b* in the toner tanks 201*y*, 201*m*, 201*c* and 201*b*, respectively. Indicating members 306*y*, 306*m*, 306*c* and 306*b* for indicating one of the toner tanks 201*y*, 201*m*, 201*c* and 201*b* electrically are installed beneath the tanks 201*y*, 201*m*, 201*c* and 201*b*. The indicating members 306*y*, 306*m*, 306*c* and 306*b* are, for example, formed of the magnetic members so that a detecting member 305 described below can discriminate the tanks 201*y*, 201*m*, 201*c* and 201*b* independently.

The detecting member 305 for detecting one of the indicating members 306*y*, 306*m*, 306*c* and 306*b* is positioned below the particle control member 1 and below the toner tanks 201*y*, 201*m*, 201*o* and 201*b*. The detecting portion 305 is, for example, formed of a coil for detecting the differences in magnetic force from each of the magnetic members as the magnetic member is moved with an associated toner tank 201*y*, 201*m*, 201*c* or 201*b*. This detecting method is well known and detailed explanation of this detecting method is omitted. The detecting member 305 includes an analog/digital converting circuit (not shown) for converting the analog signal representing the strength of the magnetic force into a digital signal. The digital signal represents one of the indicating members 306*y*, 306*m*, 306*c* and 306*b*. The detecting member 305 is, as shown in FIG. 6, connected to a control unit 304 so that the detecting member 305 outputs the signal for indicating the presence of each of the toner tanks 201*y*, 201*m*, 201*c* and 201*b* to the control unit 304.

Figure 6:
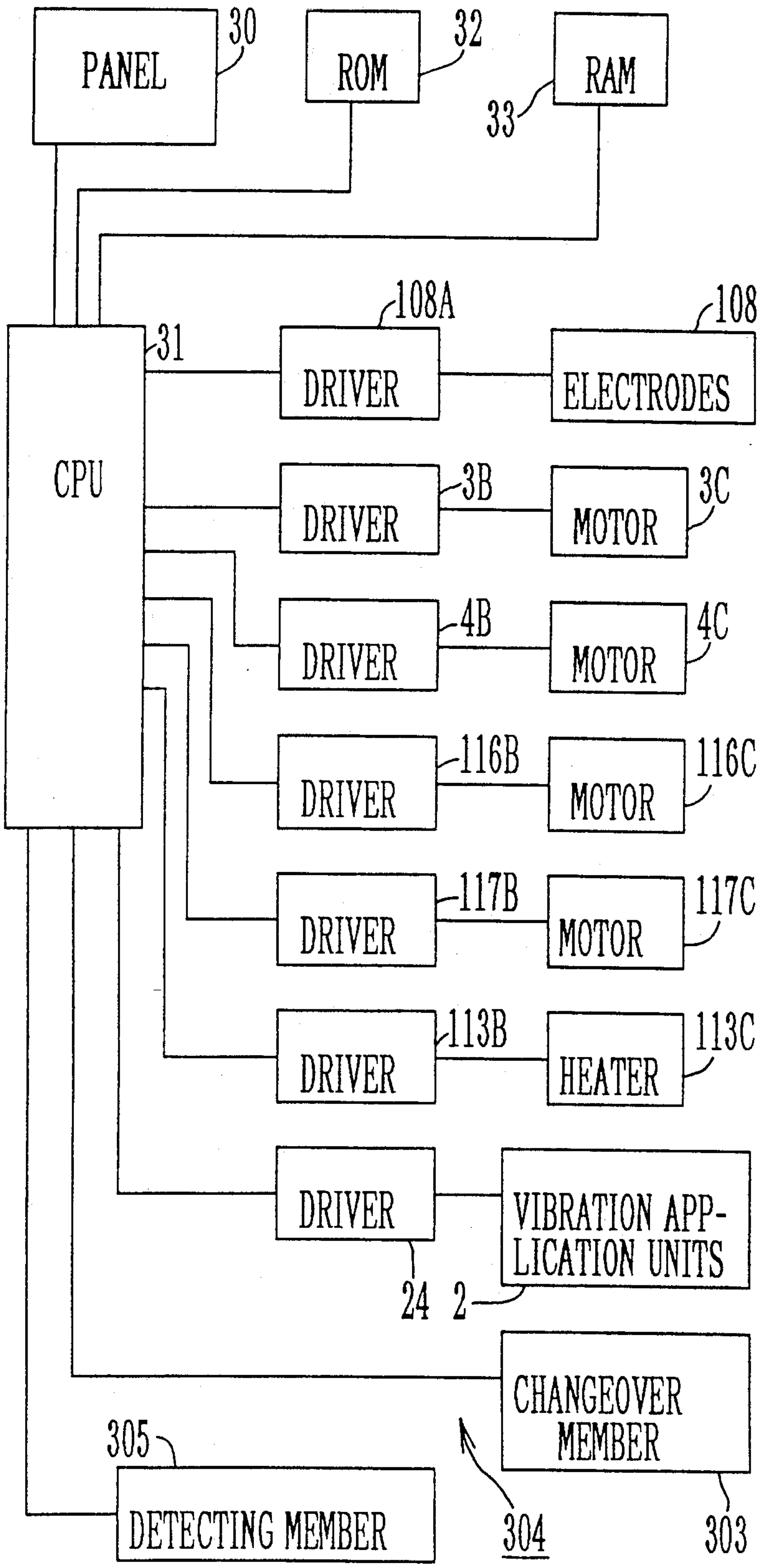
FIG. 6 is a block diagram of the control system of the first embodiment of image recording apparatus.

The four toner tanks 201*y*, 201*m*, 201*c* and 201*b* are coupled to each other and are supported on the guide 307 by a supporting member(not shown) and are moved along the guide 307 by a driving mechanism (not shown) including a motor 117C and a driver 117B (FIG. 6). A control unit 304 controls the motor 117C so that one of the toner tanks 201*y*, 201*m*, 201*c* and 201*b* can be moved into a recording position which is defined as a position immediately below the control member 1 described below. The control unit 304 recognizes the current position of each of the toner tanks 201*y*, 201*c*, 201*m* and 201*b* based on an output signal from the detection member 305, since data concerning the recording position and distances between positions of the toner tanks 201*y*, 201*c*, 201*m* and 201*b* is previously stored in the control unit 304. For example, if the control unit 304 recognizes the current position of the toner tank 201*m*, by the indicating member 306*m*, to be adjacent the detecting member 305, and is to control the toner tank 201*y* to move to the recording position, the control unit 304 determines the moving direction of the toner tank 201*y*, calculates pulses for controlling motor 117C corresponding to the distance between the current positions of toner tanks 201*y* and 201*m* and outputs the pulses corresponding to that distance to the driver 117B on the basis of the distance and position relation among positions of the toner tanks 201*y* and 201*m*. Therefore the guide 307, the motor 117C and the supporting member (not shown) function as a moving means.

Each of the brush rollers 103*y*, 103*m*, 103*c* and 103*b* have roller shafts (not shown) for rotatably mounting the rollers 103*y*, 103*m*, 103*c* and 103*b*. The roller shafts of the brush rollers 103*y*, 103*m*, 103*c* and 103*b* are selectively coupled with a motor 3C (FIG. 6) through conventional drive gear trains (not shown). Bristles (not shown) for supporting the toner particles Ty, Tm, Tc and Tb thereon are provided around the surface of each brush roller 103*y*, 103*m*, 103*c* and 103*b*, respectively.

Supply rollers 104*y*, 104*m*, 104*c* and 104*b* are arranged adjacent the brush rollers 103*y*, 103*m*, 103*c* and 103*b*, respectively, in lower positions within the toner tanks 201*y*, 201*m*, 201*c* and 201*b*, respectively. Deflection members 110*y*, 110*m*, 110*c* and 110*b* are arranged around the brush rollers 103*y*, 103*m*, 103*c* and 103*b* in upper positions of the toner tanks 201*y*, 201*m*, 201*c* and 201*b*, respectively. Blade members 111*y*, 111*m*, 111*c* and 111*b* are arranged to contact the supply rollers 104*y*, 104*m*, 104*c* and 104*b*, respectively, so that the toner particles Ty, Tm, Tc and Tb, which have been supplied to the rollers 104*y*, 104*m*, 104*c* and 104*b* in excess, are formed into a smooth, uniform surface layer. The supply rollers 104*y* 104*m*, 104*c* and 104*b* rotate counterclockwise and carry the toner particles toward blade members 111*y*, 111*m*, 111*c* and 111*b*, respectively. The brush rollers 103*y*, 103*m*, 103*c* and 103*b* rotate counterclockwise. The toner particles Ty, Tm, Tc and Tb adhere to the surface of the supply rollers 104*y*, 104*m*, 104*c* and 104*b*, and the brush rollers 103*y* 103*m*, 103*c* and 103*b* carry the toner particles Ty, Tm, Tc and Tb toward the deflection members 110*y*, 110*m*, 110*c* and 110*b*, respectively. When the supply rollers 104*y*, 104*m*, 104*c* and 104*b* engage the brush rollers 103*y*, 103*m*, 103*c* and 103*b*, the particles are triboelectrically charged as they are transferred to the brush rollers. The deflection members 110*y*, 110*m*, 110*c* and 110*b* bend the bristles of the brush rollers 103*y*, 103*m*, 103*c* and 103*b* and cause the toner particles Ty, Tm, Tc and Tb, which are carried on the rollers 103*y*, 103*m*, 103*c* and 103*b*, to be projected from the brush rollers as the bristles pass the deflection members, thereby forming a mist of the toner particles Ty, Tm, Tc or Tb below the particle control member 1. The brush rollers 103*y*, 103*m*, 103*c* and 103*b* are grounded.

Figure 3:
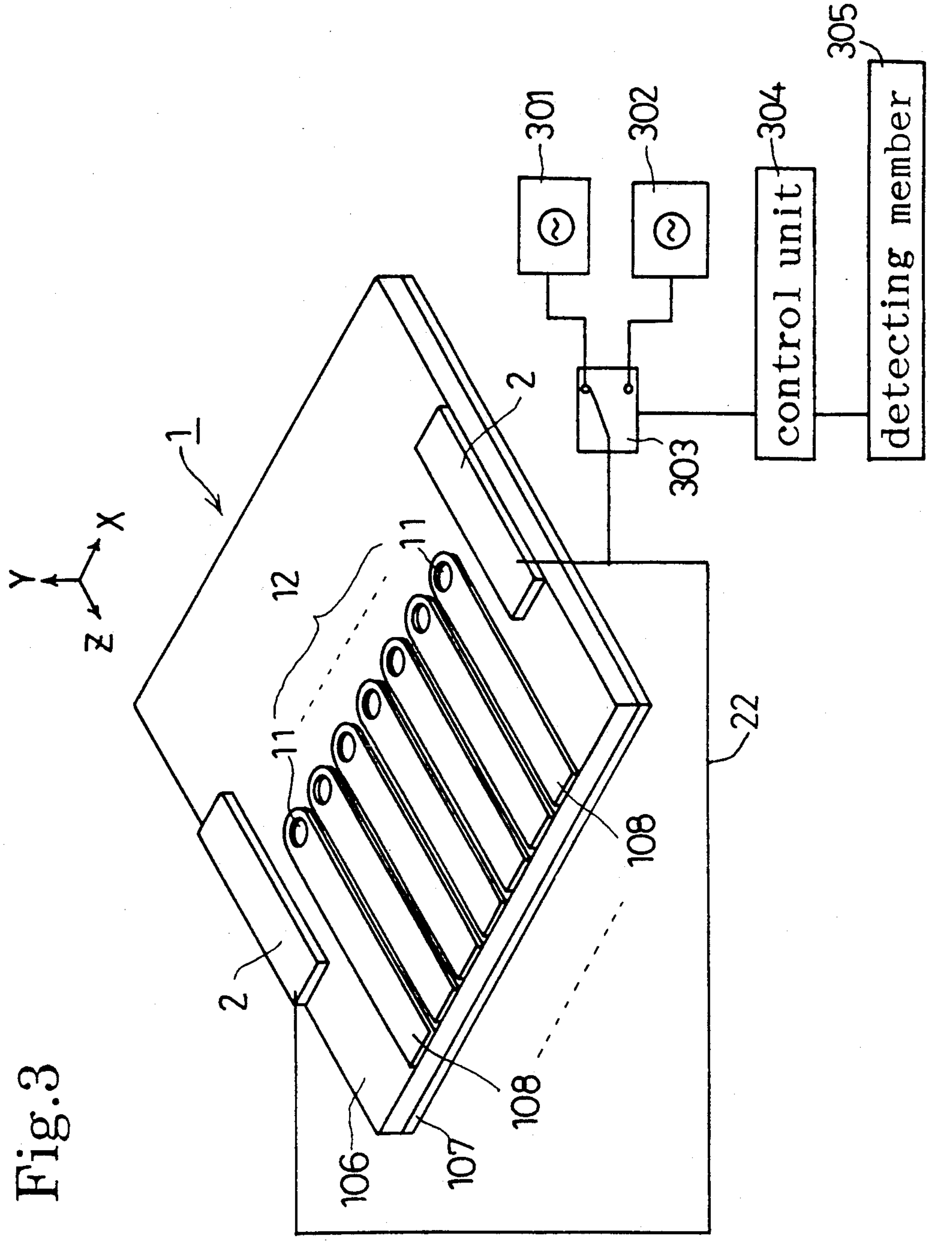
FIG. 3 is a perspective view showing the particle control member with the reference electrode facing up.

The construction of the particle control member 1 will be explained with reference to FIG. 3. FIG. 3 is a perspective view showing the particle control member 1 with the reference electrode 107 facing upwardly. The particle control member 1 comprises a plurality of apertures 12, an insulative layer 106, a reference electrode 107, and a plurality of segment control electrodes 108. The insulative layer 106 is a thin board which comprises an insulating material. Any material can be used as an insulating material if the material has an insulating characteristic. It is thus possible to use films such as a resin, ceramic, and PET (polyethylene terephthalate) film. The reference electrode 107, which is installed on the insulative layer 106, faces one of the brush rollers 103*y*, 103*m*, 103*c* and 103*b* and is a metallic layer and is grounded. The plurality of apertures 12 penetrate the insulative layer 106, the reference electrode 107 and the control electrodes 108. Moreover, the plurality of apertures 12 are arranged in one line perpendicular to the feeding direction of the medium P. In addition, the segment control electrode 108 is a metallic layer installed independently around each aperture 11 and on a side of insulative layer 106 opposite the side where the reference electrode 107 is installed. The plurality of segment control electrodes 108 are connected independently to image signal leads (not shown) connected to a driver 108A (FIG. 6) for supplying image signals to each of the segment control electrodes 108.

Figure 4:
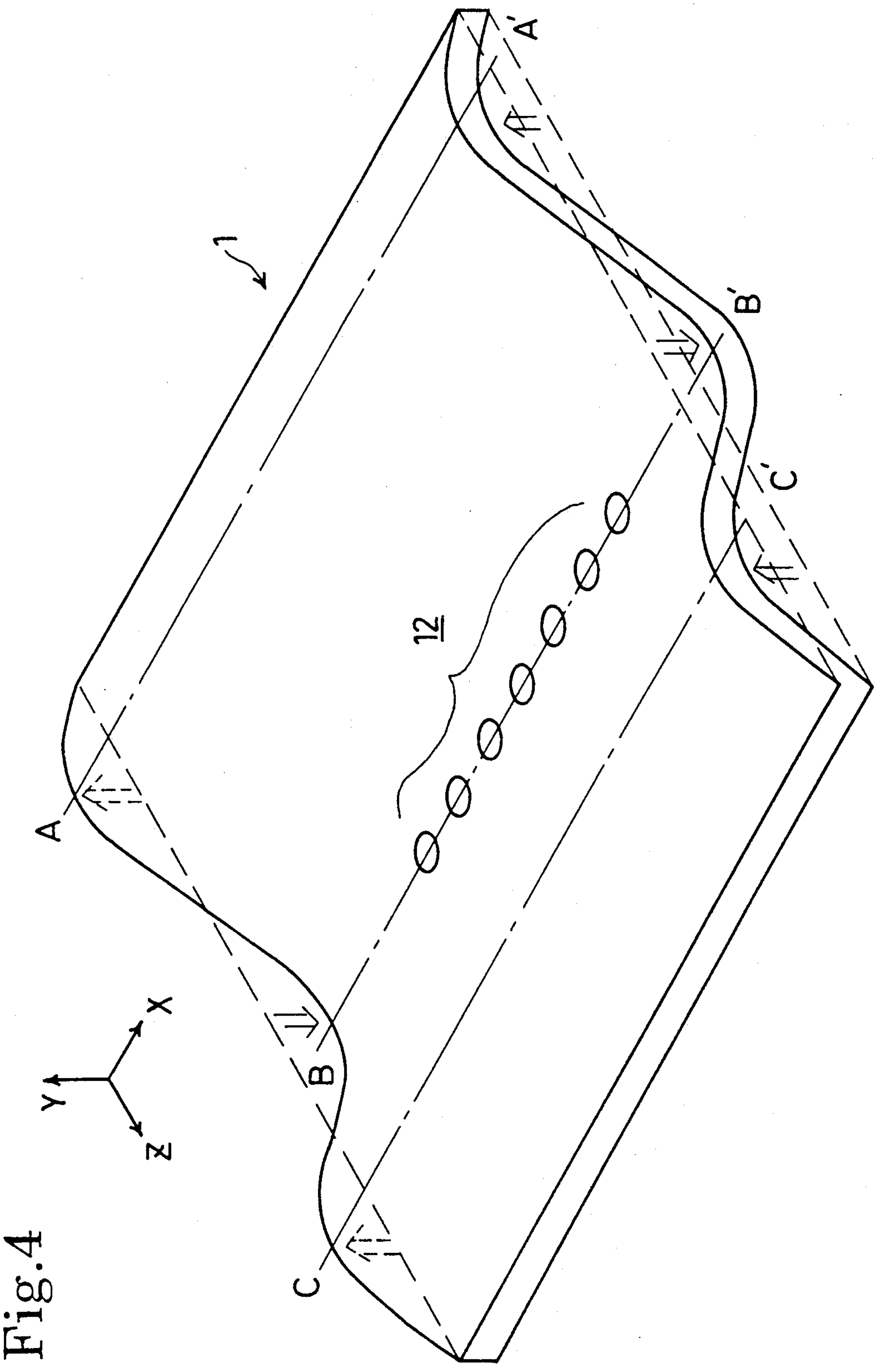
FIG. 4 is a perspective view showing vibration of the control electrode.

Further, a plurality of vibration applying units 2 are, as shown in FIG. 3, arranged on the surface of the insulative layer 106 in order to impart appropriate vibration to the particle control member as shown in FIG. 4. The vibration applying unit 2 comprises a piezoelectric member (not shown) and electric leads 22 which are supplied with alternating current from one of the A.C. power sources 301, 302 through the changeover member 303. Piezoelectric ceramic materials, such as zirconic acid lead titanate (PZT), are used for the piezoelectric member. Polymeric piezoelectric materials such as polyvinylidene fluoride, etc. can also be used. The A.C. power sources 301, 302 can supply signals having predetermined voltages V1, V2, respectively, at a predetermined frequency F corresponding to the vibration frequency of the piezoelectric members under the control of the control unit 304 acting through changeover member 303 described below. The vibration driver 24 controls the supply of the alternating current to the piezoelectric members through the leads 22 (FIG. 6).

The signal having predetermined voltage V1 of the frequency F output from the A.C. power source 301 causes a magnitude of vibration sufficient for preventing the particles Ty, Tm, Tc and Tb from adhering to the apertures 12 in the recording mode. The signal having predetermined voltage V2 of the frequency F output from the A.C. power source 302 causes a magnitude of vibration sufficient for removing the particles Ty, Tm, Tc and Tb from the apertures 12 in a no-recording mode. In this case, the voltage V2 is higher than voltage V1 and the voltages V1 and V2 are determined to vibrate the control member 1 based on the experimental measurement described below. The magnitude of the vibration of the control member 1 necessary for removing the particles Ty, Tm, Tc and Tb adhered to the apertures 12 in the no-recording mode has been measured experimentally and the measured value of the vibration of the control member 1 at the apertures 12 should impart an acceleration greater than about 20,000 m/sec$^2$. The magnitude of the vibration of the control member 1 necessary for preventing the particles Ty, Tm, Tc and Tb from adhering to the apertures 12 in the recording mode has been measured experimentally and the measured value of the vibration of the control member 1 at the apertures 12 should impart an acceleration greater than about 5000 m/sec$^2$. When one of the voltage V1 or V2 is applied to the piezoelectric member, the apertures 11 are subjected to bending vibration in a mode in which the vibration is of zero order in the x-axis direction, and of the third order in the z-axis direction. The displacement profile in the bending vibration mode is as shown in FIG. 4, in which A—A', B—B'and C—C' represents three antinode positions. The row of the apertures 12 is substantially aligned with the antinode B—B' where the vibration acceleration is maximum.

The control unit 304, which functions as control means, controls the changeover member 303 to control the vibration applying units 2 so that the magnitude of the vibration of said vibrating unit 2 is changed between recording mode, when the particles Ty, Tm, Tc and Tb carried by one of the carrying units 200*y*, 200*m*, 200*c* and 200*b* flow to the recording medium P through the apertures 12, and no-recording mode, when the particles Ty, Tm, Tc and Tb carried by the carrying units 200*y*, 200*m*, 200*c* and 200*b* do not flow to the recording medium P through the apertures 12. For example, the no-recording mode occurs when one of the toner tanks 201*y*, 201*m*, 201*c* and 201*b* is being moved toward the recording position immediately below the control member 1.

An electrode roller 112 is installed confronting one of the brush rollers 103*y*, 103*m*, 103*c* and 103*b* through the particle control member 1. There is a space between the electrode roller 112 and the particle control member 1 for feeding the recording medium P. This electrode roller 112 is connected to the negative side of a direct current power supply E2. The toner particles Ty, Tm, Tc and Tb which have passed through the apertures 11 of the particle control member 1 are attracted to the electrode roller 112 by this applied voltage. Therefore, the toner particles Ty, Tm, Tc and Tb attracted to the electrode roller 112 adhere to the recording medium P which passes between the particle control member 1 and the electrode roller 112.

The thermal fixing portion 102 comprises a heat roller 113 including a heater 113C (FIG. 6) and a press roller 114. The heat roller 113 and the press roller 114 are arranged such that the recording medium P on which the toner particles Ty, Tm, Tc and Tb have adhered can pass between both rollers. The toner particles Ty, Tm, Tc and Tb are melted by heat from the heat roller 113, and the melted toner particles Ty, Tm, Tc and Tb adhere firmly on the recording medium P by the pressure from the heat roller 113 and the press roller 114.

The control unit 304 employed in this apparatus of this embodiment will be explained with reference to FIG. 6. The control unit 304 essentially comprises a central processing unit (hereinafter called CPU) 31, a read-only memory (hereinafter called ROM) 32 and a random access memory (hereinafter called RAM) 33 which are connected by an electrical bus (not shown).

A panel 30 is connected to the CPU 31 and the panel 30 has a variety of keys including a start key (not shown). The detecting member 305 is connected to the CPU 31. The segment control electrodes 108 of the control member are connected to the CPU 31 through a driver 108A. A motor 3C for rotating one of the brush rollers 103*y*, 103*c*, 103*m* and 103*b* selectively is connected to the CPU 31 through a driver 3B so that the motor 3C is rotated at a predetermined speed, thereby to rotate one of the brush rollers 103*y*, 103*c*, 103*m* and 103*b* at a predetermined speed selectively. A motor 4C for rotating one of the supply rollers 104*y*, 104*c*, 104*m* and 104*b* selectively is connected to the CPU 31 through a driver 4B so that the motor 4C is rotated at determined speed. Therefore, one of the supply rollers 104*y*, 104*c*, 104*m* and 104*b* is rotated by the motor 4C and transports one of the types of toner particles Ty, Tm, Tc and Tb to one of the brush rollers 103*y*, 103*c*, 103*m* and 103*b* selectively.

A motor 116C for rotating the feeding rollers 116, the press roller 114, the heat roller 113 and the electrode roller 112 is connected to the CPU 31 through a driver 116B so as to feed the recording medium P from the sheet inlet 117 to the sheet outlet 118 along the feed path. A motor 117C for moving the toner tanks 201*y*, 201*m*, 201*c* and 201*b* toward the recording position is connected to the CPU 31 through a driver 117B. The heater 113C is connected to the CPU 31 through the driver 113B so that the heater 113 heats the recording medium P at a predetermined temperature to fix the toner particles Ty, Tm, Tc and Tb on the recording medium P. The changeover member 303 is connected to the CPU 31 and the vibration applying units 2 are connected to the CPU 31 through the driver 24.

Figure 5A:
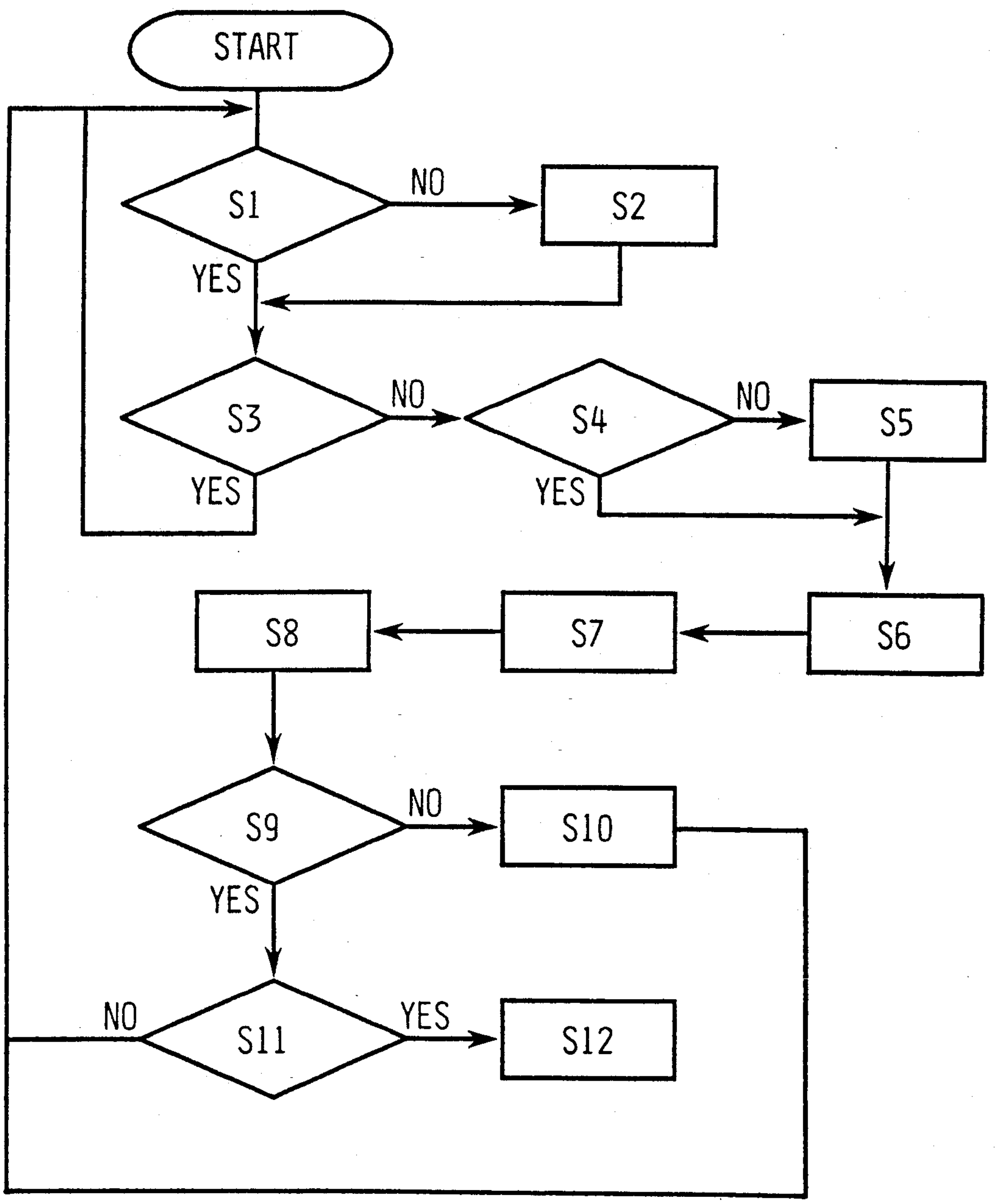

The ROM 32 stores a variety of programs for controlling the apparatus, for example, programs corresponding to a flow chart and table as shown in FIGS. 5(A) and 5(B) and a variety of data, for example, data relating to the distance between the indicating members 306*y* and 306*m*, the distance between the indicating members 306*m* and 306*c* and the distance between the indicating members 306*c* and 306*b*. The RAM 33 stores a plurality of image data for controlling the control electrodes 108 to form an image on the recording medium P and color data relating to the cyan, magenta, yellow and black colors. The CPU 31 outputs image signals relating to the image data corresponding to each of the segment control electrodes 108 through the driver 108A together with color data indicating one of the colors. The segment control electrodes 108 receive the image signals and control the formation of the color image on the recording medium P by controlling passage of the toner particles Ty, Tm, Tc and Tb through the apertures 11. When the segment control electrodes 108 receive no image signals, indicating that the color image is not formed on the recording medium P, the toner particles Ty, Tm, Tc and Tb are prevented from flowing through the apertures 11.

Next, the operation of the image recording apparatus of this embodiment will be described with reference to FIGS. 5(A) and 5(B). The recording medium P inserted through the sheet inlet 117 is first supported by the guide 115 and is fed into the image recording portion 101 by the pair of the rotatable feeding rollers 116, and stopped at a predetermined position.

The CPU 31 detects whether the changeover member 303 directs the A.C. power source 302 to vibration applying units 2 or not (S1). If the CPU 31 detects that the changeover member 303 directs the A.C. power source 301 to the vibration applying units 2 (NO at S1), the CPU 31 causes the changeover member 303 to direct the A.C. power source 302 (S2) to the vibration applying units 2. When the signal having predetermined voltage V2 of the frequency F output from the A.C. power source 302 is applied to the plurality of vibration applying units 2, the vibration applying units 2 cause the vibration of the control member 1 corresponding to a magnitude necessary for removing the charged particles Ty, Tm, Tc and Tb from the apertures 12 in the no-recording mode. Therefore, the apertures 11 are cleaned fully whenever the no-recording mode takes place, thereby preventing a mixture of the different particles Ty, Tm, Tc and Tb from adhering to the recording medium P through the apertures 11.

The CPU 31 then detects whether the no-recording mode exists or not (S3). The detection of the recording mode depends on whether the detecting member 305 detects one of the indicating members 306*y*, 306*m*, 306*c* and 306*b*. That is, the CPU 31 detects the recording mode when the detecting member 305 detects one of the indicating members 306*y*, 306*m*, 306*c* and 306*b*. If the CPU 31 has detected that the no-recording mode has not finished (YES at S3), the CPU 31 returns to step S1. If the CPU 31 detects that the recording mode has finished (NO at S3), the CPU 31 detects whether the changeover member 303 directs the A.C. power source 301 or not (S4). If the CPU 31 detects that the changeover member 303 directs the A.C. power source 302 (NO at S4), the CPU 31 causes the changeover member 303 to direct the A.C. power source 301 (S5) to vibration applying unit 2. When the signal having predetermined voltage V1 of the frequency F output from the A.C. power source 301 is applied to the plurality of vibration applying units 2, the vibration applying units 2 cause vibration of the control member 1 corresponding to the magnitude necessary for preventing the charged particles Ty, Tm, Tc and Tb from adhering to the apertures 11 in the recording mode. Thus, as a result of the vibration of the particle control member 1, even if the toner particles Ty, Tm, Tc and Tb are attracted to the reference electrode 107, the toner particles Ty, Tm, Tc and Tb tend not to adhere to the reference electrode 107.

When the recording medium P is fed into the image recording portion 101, the CPU 31 detects which one of the carrying units 200*y*, 200*m*, 200*c* and 200*b* is disposed at the recording position immediately below the control member 1 based on the detection made by the detecting member 305 (S6). When the CPU 31 has detected which the carrying units 200*y*, 200*m*, 200*c* and 200*b* is disposed at the recording position, the CPU 31 directs the motor 117C, through the driver 117B, to position a predetermined one of the carrying units 200*y*, 200*m*, 200*c* and 200*b*, for example, the carrying unit 200*y* for accommodating the yellow toner particles Ty, to be disposed at the recording position (S7). The CPU 31 performs a recording operation relating to a predetermined color image, for example, the yellow color image recording operation described below (S8). The CPU 31 detects whether the recording operation relating to all color images has been completed or not (S9). If the CPU 31 detects that the recording operation of one dot line for all color images has been completed (YES at S9), the CPU 31 directs the motor 117C so that the recording medium P is fed by one dot line (S10). If the CPU 31 detects that the recording operation of one dot line relating to all color images has not completed (NO at S9), the CPU 31 returns to step S1 in order to perform the recording operation of one dot line relating to another color image, for example, the cyan color image.

The order of recording operation relating to each color is determined previously, for example, in yellow color, cyan color, magenta color and black color sequence. The CPU 31 detects whether the recording operation relating to all color images on the recording medium P has completed or not (S11). If the CPU 31 detects that the recording operation relating to all color images on the recording medium P has completed (YES at S11), the CPU 31 directs the motor 117C to drive the recording medium P by a predetermined amount toward the outlet 118 (S12).

The recording operation relating to a predetermined color image, for example, the yellow color image will be described below.

The CPU 31 controls the motor 4C through the driver 4B so that a predetermined one of supply rollers 104*y*, 104*c*, 104*m* and 104*b*, for example, the supply roller 104*y*, rotates counterclockwise. The yellow toner particles Ty are triboelectrically charged, for example in a positive polarity, between the supply roller 104*y* and the toner tank 201*y*. The CPU 31 controls the motor 3C through the driver 3B so that a predetermined one of brush rollers 103*y*, 103*c*, 103*m* and 103*b*, for example, the brush roller 103*y*, rotates counterclockwise. The yellow toner particles Ty supplied in excess to the supply roller 104*y* are removed by the blade member 111*y*. As a result, a toner layer having a uniform thickness and a smooth surface is formed on the surface of the supply roller 104*y*. The toner particles Ty charged to a positive polarity are supported on the surface of the supply roller 104*y* and are fed to come in contact with the brush roller 103*y*. At this time, the yellow toner particles Ty are further triboelectrically charged by contacting the brush roller 103*y* rotated counterclockwise. Then, the yellow toner particles Ty are firmly positively charged.

The positively charged toner particles Ty move from the surface of the supply roller 104*y* to the bristles of the brush roller 103*y*. When the brush roller 103*y* rotates counterclockwise, the brush comes in contact with the deflection member 110*y* and the bristles bend. When the brush roller 103*y* rotates further counterclockwise, the bristles move away from the deflection member 110*y*. The bristles then return to their original position by their own elasticity. At this moment, the toner particles Ty which are supported on the brush roller 103*y* separate from the brush roller 103*y*. As a result, the toner particles Ty, thus separated from the brush roller 103*y* form a mist or suspension of the toner particles Ty below the particle control member 1.

The positively changed toner particles Ty are attracted to the reference electrode 107 connected to the direct current power supply E1 of negative polarity. The CPU 31 outputs a plurality of image data corresponding to the control electrodes 108 from the RAM 33.

When CPU 31 provides image signals corresponding to the image data to the segment control electrodes 108 through the driver 108A, it also provides the color data indicating yellow color from the RAM 33.

The flow of the yellow toner particles Ty is directly modulated by the image signal (the image signal consists of a positive voltage and 0 voltage) provided to the segment control electrode 108 of the particle control member 1. Therefore, if a positive voltage is applied to the segment control electrode 108 of the aperture 11 on the basis of the image signal, the toner particles Ty cannot pass through the aperture 11, since the toner particles Ty are positively charged. The yellow toner particles Ty can pass through the aperture when 0 voltage is applied to the segment control electrode 108 of the aperture 11 on the basis of the image signal.

The yellow toner particles Ty supplied in the form of a mist are modulated with the segment control electrode 108 of the particle control member 1 receiving the image signal from the CPU 31. The toner particles Ty which pass through the particle control member 1 are positively charged. As a result, the toner particles Ty are drawn toward the negatively charged electrode roller 112. The toner particles Ty are thus attracted toward the recording medium P which has been fed by the guide 115 into the space between the particle control member and the electrode roller 12. In this manner, the CPU 31 performs the recording operation for the yellow image.

Likewise, the CPU 31 performs the recording operation of the other color images, that is, is cyan, magenta, and black images.

After the color toner particles Ty, Tm, Tc and Tb are brought into contact with the recording medium P, the pair of feeding rollers 116 feeds the recording medium P along a guide. The toner particles Ty, Tm, Tc and Tb which adhere to the recording medium P by passing through each aperture 11 form each dot of the recorded image.

Afterwards, the recording medium P on which the toner particles Ty, Tm, Tc and Tb adhere is supported by the guide 115. The recording medium P is nipped by the pair of rotatable feeding roller 116, and is fed to the thermal fixing station 102. The recording medium P on which the toner particles Ty, Tm, Tc and Tb adhere is pressed by the heat roller 113 and the press roller 114 in the thermal fixing station 102. At this time, the toner particles Ty, Tm, Tc and Tb on the recording medium P melt and are fixed by heat from the heater 113C in the heat roller 113. A detailed explanation of the thermal fixation will be omitted because it is generally well known. Finally, the recording medium P on which the image is fixed is supported by the guide 115 and by the pair of rotatable feeding rollers 116, is fed to the sheet outlet 118, and is discharged from the image recording apparatus 100.

Figure 7:
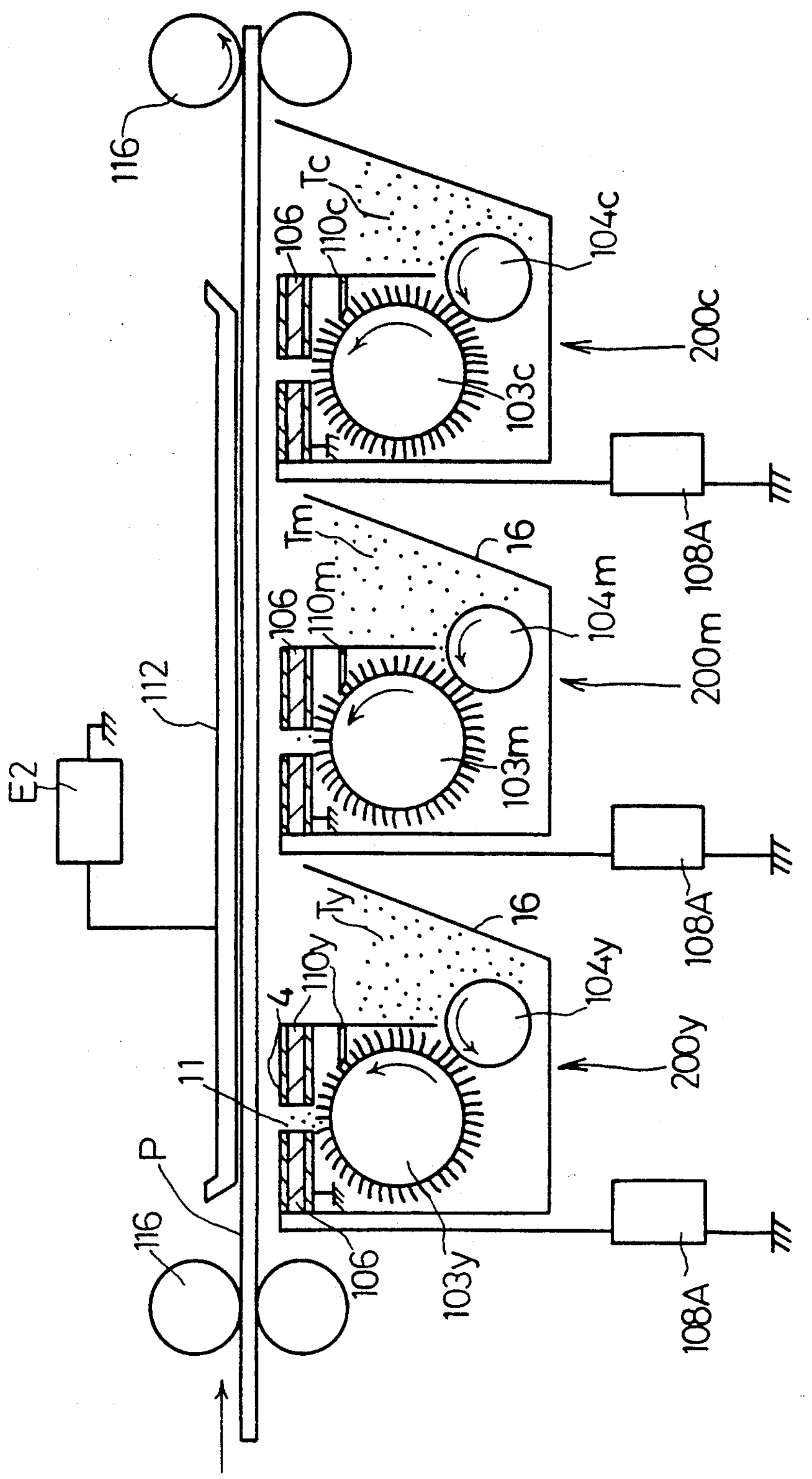
FIG. 7 is shows a second embodiment of an image recording apparatus which embodies the invention.

Next the second embodiment will be described with reference to FIG. 7.

The main difference between the first embodiment and the second embodiment is that a particle control member 1 corresponding to each of the carrying units 200 for carrying charged toner particles and forming a mist of the charged toner particles is provided in the recording apparatus of the second embodiment. The common elements between the first embodiment and the second embodiment are designated to same references and the detailed explanation relating to the common elements will be omitted.

Based on the main difference, the driving operation for the carrying units in the recording apparatus of the first embodiment is different from the operation for driving operation for the carrying units in the recording apparatus of the second embodiment. That is, in the recording apparatus in the second embodiment, a control unit detects the position of the recording medium P and drives a corresponding carrying unit 200 independently so that each of the carrying units 200 carry charged toner particles and forms a mist of the charged toner particles based on detection of the position of the recording medium P. Thus, instead of the carrying units being movable relative to the recording medium, as in the first embodiment, the recording medium in the second embodiment is moved relative to the stationary carrying units. In this arrangement, a separate particle control member 1 must be provided for each carrying unit.

It is to be understood that the invention is not limited to the above described embodiments, and various modifications and alterations can be added there to without departing from the scope of the invention encompassed by the appended claims.

What is claimed is:

1. A color image recording apparatus for recording a color image on a recording medium with charged particles having predetermined colors comprising:

feeding means for feeding the recording medium;

control electrode means for controlling the flow of charged particles to the recording medium, the control electrode means having at least one row of apertures through which the charged particles pass based on an image signal, said control electrode means including an insulative layer, a reference electrode on one surface of said insulative layer and at least one segment control electrode on a surface of said insulative layer opposite to the reference electrode, to which the image signal is applied, each of said apertures passing through said at least one segment control electrode, said insulative layer and said reference electrode;

a plurality of carrying units for providing the charged particles, said carrying units being positionable at a position confronting the recording medium through said control electrode means so that the charged particles provided by the carrying units are carried to the recording medium through the apertures;

moving means for moving said carrying units to the position confronting the recording medium through said control electrode means;

vibrating means for vibrating said control electrode means; and controlling means for controlling said vibrating means so that a magnitude of the vibration of said control electrode means may be changed, wherein the magnitude of the vibration of said control electrode means is changed between a recording mode, when particles flow through the control electrode means based on said image signal, and a no-recording mode, when particles do not flow through the control electrode means.

2. The image recording apparatus as in claim 1, further comprising means for establishing said no-recording mode when said moving means moves said carrying units.

3. The image recording apparatus as in claim 2, wherein said carrying units are disposed in order along a feeding direction of the recording medium.

4. The image recording apparatus as in claim 1, further comprising controlling means for providing an image signal to said segment control electrode, when one of said carrying units is disposed at the position confronting the recording medium through said control electrode means.

5. An image recording apparatus for recording an image on a recording medium with charged particles, the image recording apparatus comprising:

carrying means for providing the charged particles;

a control electrode having at least one row of apertures through which said charged particles provided by said carrying means pass;

a back electrode confronting said carrying means through said control electrode, said back electrode being spaced from the control electrode by a space enabling passage of the recording medium on which said image is recorded;

vibration applying means for vibrating said control electrode;

controlling means for controlling said vibration applying means so that a magnitude of vibration of said vibrating means is changed between a recording mode, when the charged particles provided by the carrying unit flow to the recording medium through the apertures and a no-recording mode, when the charged particles do not flow through the apertures.

6. The image recording apparatus as in claim 5, wherein the magnitude of the vibration in the recording mode is a predetermined value sufficient for preventing the charged particles from adhering to the apertures.

7. The image recording apparatus as in claim 5, wherein the magnitude of the vibration in the no-recording mode is a predetermined value sufficient for removing charged particles adhered to the apertures.

8. The image recording apparatus as in claim 5, wherein, said carrying means comprises a plurality of carrying units, each carrying unit providing charged particles of a color different from the other carrying units, and each of said carrying units being disposable at a position confronting the recording medium through said control electrode means so that the charged particles carried by the carrying unit are carried to the recording medium through the apertures, the image recording apparatus further comprising, moving means for moving each of said carrying units to the position disposed confronting the recording medium through said control electrode means.

9. A control member for controlling a passage of toner particles to a recording medium comprising:

a body;

a carrying element for providing the toner particles;

at least one aperture extending through the body, through which the toner particles provided by the carrying element can pass;

a reference electrode on one side of the body;

a control electrode on a side of the body opposite to the reference electrode for controlling the passage of the toner particles through the aperture;

a vibrating member for vibrating the body;

a power supply means for causing the vibrating member to vibrate the body at a first magnitude for preventing the toner particles from adhering to said at least one aperture and for causing the vibrating member to vibrate at a second magnitude for removing as least some of said particles which have adhered to said at least one aperture; and means for controlling the power supply means to cause the vibration of the body at the first magnitude and the second magnitude.

10. The control member as in claim 9, further comprising a plurality of apertures in said body and a plurality of control electrodes, each control electrode being associated with a corresponding aperture of said plurality of apertures.

11. A color image recording apparatus for recording a color image on a recording medium with charged particles having predetermined colors comprising:

feeding means for feeding the recording medium;

a plurality of control electrode means for controlling the flow of said charged particles to the recording medium, each control electrode means having at least one aperture through which the charged particles pass based on an image signal, each of said plurality of control electrode means including an insulative layer, a reference electrode on one surface of said insulative layer, and a segment control electrode on a surface of said insulative layer opposite to the reference electrode, to which the image signal is applied, the at least one aperture passing through the segment control electrode, said insulative layer and said reference electrode;

a plurality of carrying units providing said charged particles, each carrying unit being positioned at a position confronting the recording medium through one of said plurality of control electrode means, each of the plurality of carrying units supplying at least said charged particles of one of said predetermined colors different from another of said plurality of carrying units;

means for moving the recording medium relative to the plurality of control electrode means;

vibrating means for vibrating said plurality of control electrode means; and controlling means for controlling said vibrating means so that a magnitude of the vibration of said plurality of control electrode means may be changed, wherein the magnitude of the vibration of said plurality of control electrode means is changed between a recording mode, when particles flow through the plurality of control electrode means based on said image signal, and a no-recording mode, when particles do not flow through the plurality of control electrode means.

12. The image recording apparatus as in claim 11, wherein said carrying units are disposed in order along a feeding direction of the recording medium.

* * * * *